J. PRESCOTT.
REFUSE BURNER.
APPLICATION FILED NOV. 22, 1911.
1,069,577.
Patented Aug. 5, 1913.
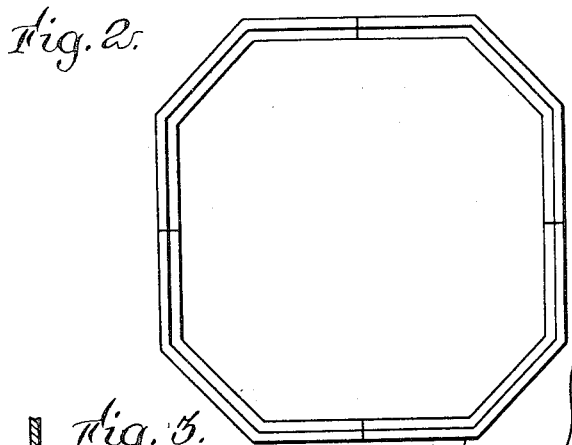
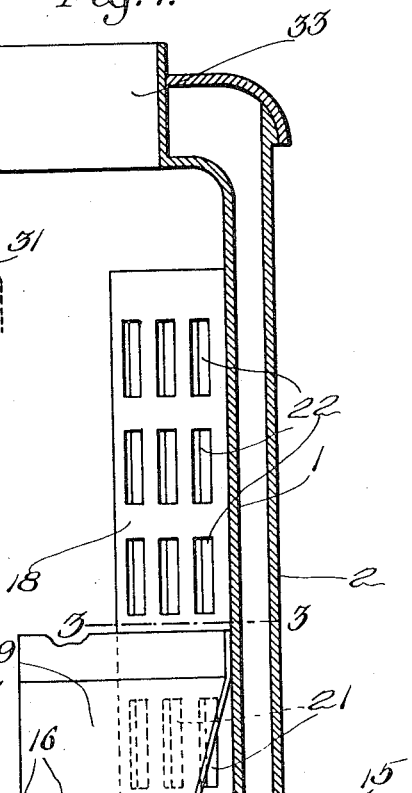
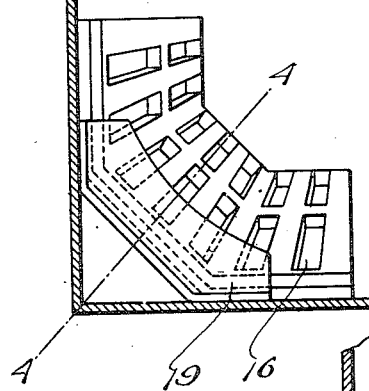
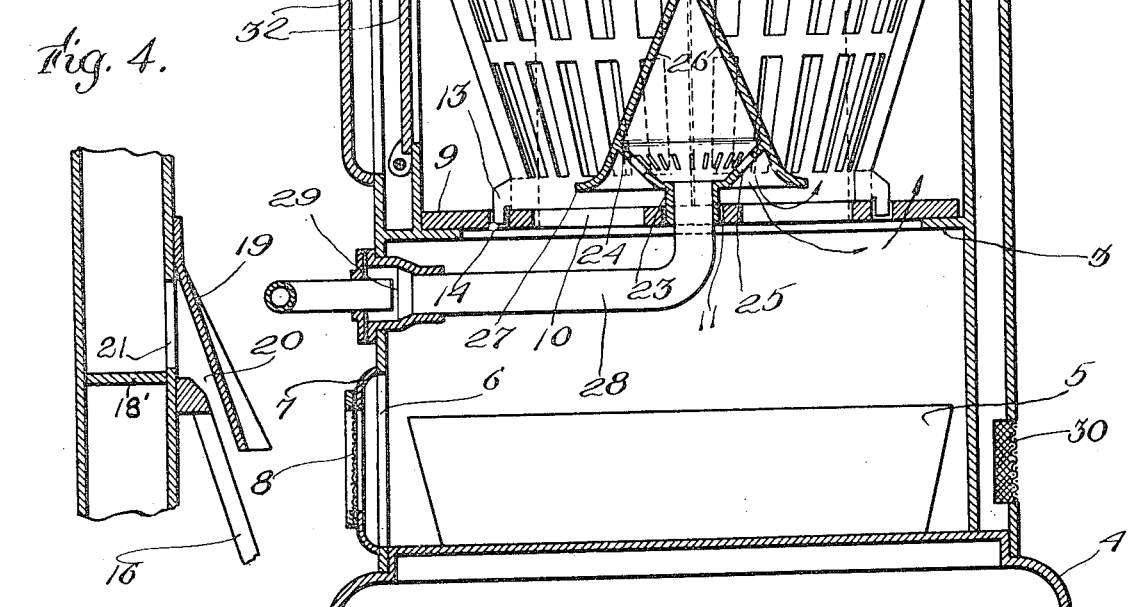
Witnesses:
C. L. Rogers
R. G. Hersey
Inventor:
Jesse Prescott,
by Geo. H. Maxwell
Attorney.

UNITED STATES PATENT OFFICE.

JESSE PRESCOTT, OF WEBSTER, MASSACHUSETTS.

REFUSE-BURNER.

1,069,577.

Specification of Letters Patent.

Patented Aug. 5, 1913.

Application filed November 22, 1911. Serial No. 661,755.

*To all whom it may concern:*

Be it known that I, JESSE PRESCOTT, a citizen of the United States, and resident of Webster, in the county of Worcester and State of Massachusetts, have invented an Improvement in Refuse-Burners, of which the following description, in connection with the accompanying drawings, is a specification, like letters on the drawings representing like parts.

In my earlier copending application, Serial No. 614,496, filed March 14, 1911, I have shown a refuse consumer for the burning of domestic and other garbage and like refuse, wherein an upright rectangular receptacle is provided with an outwardly flaring openwork grate in its lower portion extending out at its top to fit the inner wall of the receptacle, the receptacle being provided with corner flues extending down below the top of the flaring grate to provide an initial vent for the products of combustion of a gas burner at the base of the grate.

The present invention is an improvement in this type of burner, and has for its special objects the provision of improved means for insuring an initial vent for the products of combustion, while also promoting the spread of the flame to strike against the garbage mass.

A further feature of the invention relates to means for ventilating the space between the inner and outer shells so that a circulation is provided in the intermediate air space and the outer shell will not become excessively heated.

The invention will be better understood from the following detailed description, taken in connection with the accompanying drawings, and will be thereafter pointed out in the appended claims.

Referring to the drawings, Figure 1 is a central vertical section through my improved incinerator; Fig. 2 is a plan view showing the top of the flaring grate and the sectional form thereof; Fig. 3 is a fragmentary transverse section on line 3—3 of Fig. 1 the flue plate 18 being omitted; and Fig. 4 is a fragmentary vertical section on line 4—4 of Fig. 3.

The casing comprises an inner receptacle 1 and an outer shell 2 rectangular in form and preferably square as shown, the inner receptacle being spaced away from the outer shell to leave an insulating air space. The shell and receptacle rest on a suitable base 4, and an ash pan 5 seated on the base is removable through a lateral opening 6, this opening being closed by a door 7 having its central portion cut out, with a screen mesh 8 stretched over the opening to permit the entrance of air currents for promoting evaporation in the material, and the screen being provided to prevent the entrance of vermin to the interior of the receptacle. The inner receptacle at the front does not extend to the base but rests on a flange inwardly extending from the outer shell, and a flange 3 extending inwardly from the inner receptacle at the same elevation as shown furnishes a support for a horizontal grate 9 having radial slots 10 around a central opening 11 which receives the gas burner, to be later described. An outwardly flaring openwork grate 12 rests on the horizontal grate 9 and, as shown, is provided with lugs 13 to engage with recesses 14 in the horizontal grate. The top of this flaring grate is provided with a flange 15, and it is freely provided throughout with relatively wide elongated vertically extending slots 16. This grate is preferably sectional in construction, being, as shown, in four pieces, with the section lines indicated at 17, so as to be capable of convenient assembling in the receptacle and easy removal when required. Plate portions 18 extend across the corners of the inner receptacle 1 to provide corner flues up through the receptacle from the top of the flaring grate, and the top flange 15 of this grate is conformed to these flues and to the intermediate walls of the receptacle, as seen in Fig. 2.

According to the present invention, the corner flues formed by the plates 18 as such do not extend below the top flange 15 of the flaring grate there being at this point partitions 18' therein, and, to insure initial vent openings for the products of combustion immediately after the gas burner is lighted and before the garbage mass has appreciably shrunk, shield plates or baffles 19 are fixed in place over the plates 18 at the corners of the receptacle some little distance above the flange 15 to extend down over the same and over the upper portions of the slots 16 in the grate with a space 20 between the shield plates and the top of the grate. The corner plates 18 are provided with slotted openings 21 a short distance above the flange 15 and within the space protected by the baffle plates 19, so that the garbage mass is effectually kept away from clogging the upper portions of the grate slots 16 and the corner-flue slots 21. Thus a sufficient vent for the products of combustion from the gas burner beneath up into the corner flues is always insured even though the receptacle may be filled with wet garbage which completely stops up the main portions of the grate slots. The corner flue plates 18 preferably extend up to near the top of the receptacle and may be provided with other series of slots 22 at intervals. The gas burner may be formed similarly to that of my prior application above referred to, and consists in a neck portion 23 fitted in the central aperture 11 in the grate with an outwardly diverging conical portion 24 having a series of slits 25 therein to direct the flame down through the slots 10, and also having a conical hood 26 fixed thereover extending well up into the receptacle space. This hood has a downwardly and outwardly extending rim 27 which aids in directing the annulus of flame outward to encompass the garbage mass. The burner is supplied with gaseous fuel from a pipe 28 having any suitable form of mixer 29 associated therewith. To prevent excessive heating of the outer shell 2, I preferably provide means for permitting the air in the space between this shell and the inner receptacle 1 to circulate to some extent and escape from near the top of the receptacle. To this end, one or more screened openings 30 are formed in the outer shell in the lower portion thereof, and other similar screened openings 31 near the top of the outer shell. The inner receptacle and outer shell are provided with suitable doors 32 permitting convenient access to the grate structure, and a stack connection 33 extends from the receptacle.

In use, as the receptacle is filled with garbage, usually more or less wet, air currents passing up through the screened opening 8 always have a vent up through the receptacle by reason of the portions of the slots 16 and the slots 21 protected by the baffle plates 19 and the air thus drawn up through the apparatus strikes to a considerable extent against the garbage mass in the flaring grate portion through the openings therein by reason of the flaring construction which constantly intercepts the normal upward course of the air currents. Thus the drying out of the garbage is expedited and a less amount of gaseous fuel is required for its combustion later. In like manner, when the gas is ignited, the baffle plates 19 insure an initial vent for the products of combustion, and the flame is caused to be drawn upward along the flaring grate, constantly striking against the garbage therein through the slot openings, so that the combustion of the garbage is initiated and completed very quickly and with a minimum consumption of gas.

It is to be observed that in this improved form of my refuse consumer, as well as in the previous form, the entire central portion of the receptacle space is unobstructed, so that a relatively large receiving capacity is provided, while the special construction and correlation of the central burner, the flaring grate, and the corner flues insure the spreading out and direction of the flame in a manner to most effectively attack the garbage and insure its rapid and complete consumption. In the present improved construction, it is to be noted that the drying currents of air or the products of combustion with the burner lighted, as the case may be, are required to seek an initial outlet by being drawn inwardly through the flaring grate slots, i. e. these currents are directed from the start against the sides of the garbage mass so that they act at all times most effectively for the purpose in view.

I am aware that various of the details of construction shown in the present illustrative embodiment of my invention can be modified without departing from the spirit thereof, and I therefore do not desire to be limited as to these or in any other particulars except as set forth in the appended claims.

Having described my invention, what I claim as new and desire to secure by Letters Patent is:

1. An apparatus of the kind described, comprising an upright rectangular receptacle, an upwardly outwardly flaring openwork grate in the lower portion thereof having its top substantially fitting the walls of the receptacle and provided with openings, means for dividing off the corners of the receptacle to form corner flues extending from above the top of said grate with openings therethrough just above the top of the grate, and means extending down in front of said flue openings and over the openings in the upper part of the grate for shielding the upper portion of the grate and the flue openings to insure an initial vent for the products of combustion.

2. An apparatus of the kind described, comprising an upright rectangular casing, having an upwardly outwardly flaring slotted grate in the lower portion thereof with the top of the said grate substantially fitting the walls of the casing, means arranged to partition off the corner spaces of said casing to form corner flues extending from above said grate with openings therethrough just above the top of the grate, and baffle plates extending obliquely downward over said flue openings and over portions of the grate slots in position to insure vent passages from below the grate, and a burner for gaseous fuel arranged adjacent the lower portion of the grate in position to direct flame to impinge against the garbage mass therein.

3. An apparatus of the kind described, comprising an upright rectangular casing, an upright slotted grate in the lower portion thereof having its top substantially fitting the inner walls of the receptacle and its lower portion drawn in to leave an annular space between it and the receptacle, means for forming flues in the corners of the receptacle with openings above the top of said grate only, baffle plates arranged to protect the passageways from certain of the openings in said grate to the openings in said corner flues, and a burner for gaseous fuel mounted in the lower portion of the receptacle in position to direct flame over the garbage mass therein.

In testimony whereof, I have signed my name to this specification, in the presence of two subscribing witnesses.

JESSE PRESCOTT.

Witnesses:
C. L. ROGERS,
R. G. HERSEY.